Oct. 28, 1969     E. E. HIEBER     3,475,001

AERIAL REFUELING PROBE NOZZLE

Filed April 24, 1967     2 Sheets-Sheet 2

ELLSWORTH E. HIEBER
INVENTOR.
WHANN & McMANIGAL
Attorneys for Applicant
BY

United States Patent Office 3,475,001
Patented Oct. 28, 1969

3,475,001
AERIAL REFUELING PROBE NOZZLE
Ellsworth E. Hieber, Glendale, Calif., assignor to Schulz Tool and Manufacturing Co., San Gabriel, Calif., a corporation of California
Filed Apr. 24, 1967, Ser. No. 633,007
Int. Cl. F16k *51/00;* F16l *33/00*
U.S. Cl. 251—149.8                5 Claims

ABSTRACT OF THE DISCLOSURE

A probe nozzle for use in cooperation with a drogue for in-flight refueling of aircraft and in which the probe valve is permitted to deflect a predetermined amount laterally without permanent deformation.

Background of the invention

This invention forms a part of a system wherein a tubular connection is lowered from a tanker plane and with which connections are made with a forwardly extending conduit member on a plane to be refueled.

The conduit extending from a tanker plane carries at its end a fitting called a drogue, and with which fluid-tight connections are made by a fitting, called a probe, at the end of the conduit member extending forwardly from a plane to be refueled. The connection between the drogue and probe is made in mid-air and is a universal connection to accommodate relative movements of the plane in flight.

A prior art probe is shown in United States Letters patent to Mosher, No. 2,946,605, for In-Flight Aircraft Refueling Apparatus.

In the prior art, there has been a tendency for tthe probe valves to become caught in the drogue as the probe and drogue are being disengaged. This has resulted in damage to the probe valve or to the probe valve stem so that the probe is no longer operable without repairs. This problem has been solved by providing a flexible stem for the nozzle valve and which permits a deflection of the valve stem and valve ¾ of an inch sideways without permanent deformation.

Summary of the invention

It is an object of the invention to provide an improved probe for use in in-flight refueling systems.

It is another object of the invention to provide an improved probe nozzle valve and stem, the stem acting as a spring rod. The rod permits a lateral deflection of the probe valve, when it is open and being disengaged, and also provides a limit stop for the deflection of the stem.

Further objects and advantages of the invention may be brought out in the following part of the specification wherein small details have been described for the competance of disclosure, without intending to limit the scope of the invention which is set forth in the appended claims.

Brief description of the drawings

Referring to the accompanying drawings, which are for illustrative purposes.

Description of the preferred embodiments

Figure 1:
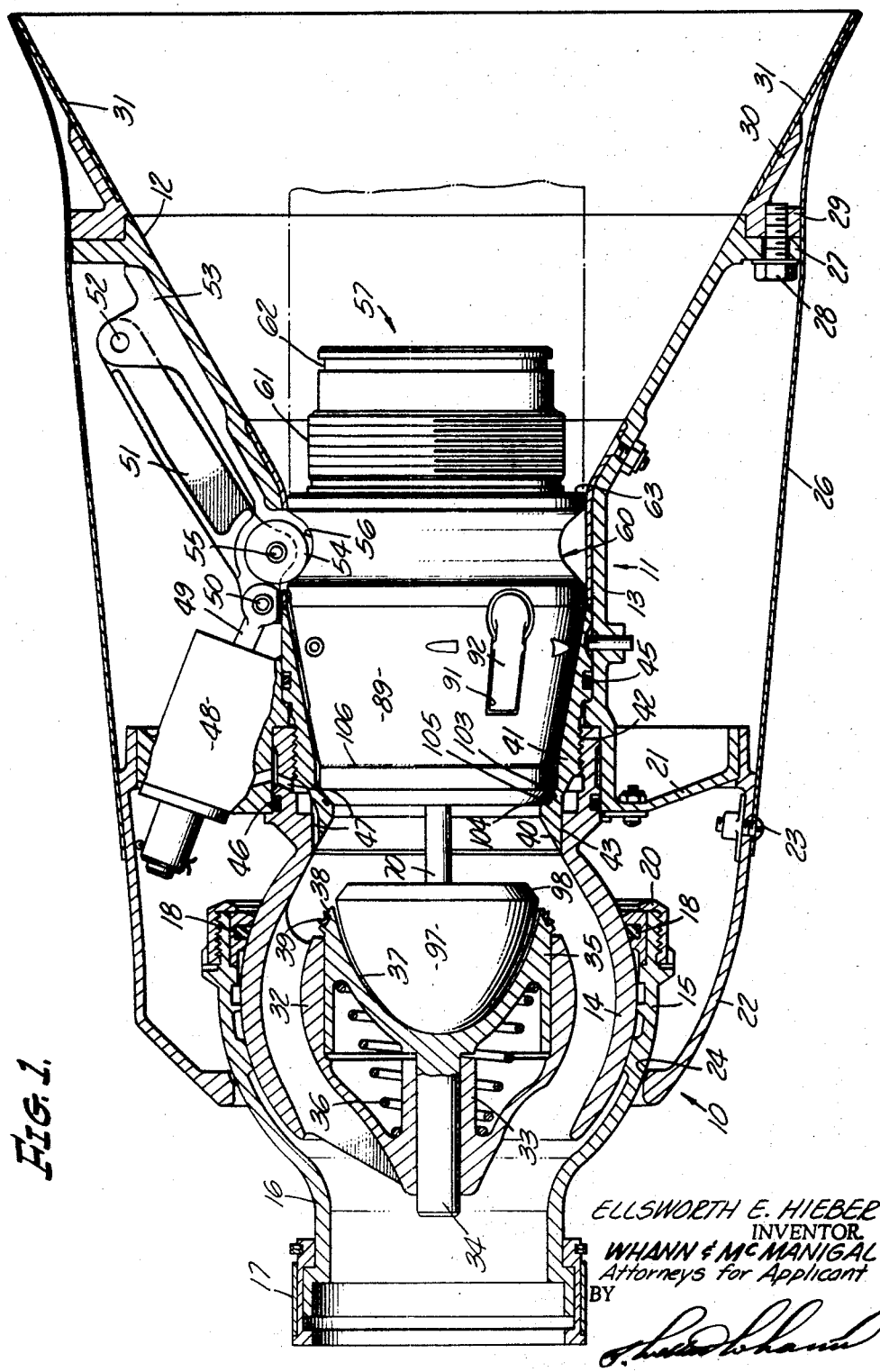
FIG. 1 is a partially cross-sectional view of the probe, according to the invention, in operational connection within a drogue.

Referring to FIG. 1, the drogue 10 includes a member generally designated at 11 which includes a conical or bell-shaped portion 12, an intermediate cylindrical portion 13 and a generally spherical portion 14 at its left end. The spherical portion 14 forms a ball of a ball and socket joint, the socket member being designated as 15 and being generally hemispherical in shape. The socket member is cylindrical at its open end 16 and carries a ring-shaped coupling 17 for connecting the socket member to an articulated conduit assembly extending downwardly from the tanker airplane which supplies the fuel for the plane being fueled.

The inner end of the socket is cylindrical and carries a seal 18 which engages the ball 14. The seal is held in position by a locking ring 20 engaging the cylindrical portion of the socket in a screw-threaded relationship. The connection between the socket and ball provides for universal movement of the part 11 of the drogue relative to the socket and coupling member 17.

The portion 13 of the member 11 has outwardly extending webs at 21 to which is attached a generally circular and partially frusto-conical member 22 by bolts as shown at 23. The left end of the member 22 is tapered and it has a inner spherical surface 24 spaced outwardly from and so as to move along the exterior of the socket 15. The conical shell 26 is attached to the member 22 and extends around the cone or bell-shaped portion 12 of the drogue. The portion 12 has a radially extending flange 27 on which the shell 26 is supported. A ring-shaped member 29 is secured to the flange 27 and has a flared extension 30, against the inner surface of which is a cone-shaped member 31 having an inner surface flush with the interior of the cone-shaped member 12.

Within the ball 14 there is formed a generally hemispherical web 32 having a central longitudinal guide member 33 within which is received a stem 34 of a poppet valve 35. The poppet valve 35 operates against a coil spring 36 surrounding the guide 33. The poppet valve is conical in shape having an inner concave dome-shaped face 37 and having a sealing face 38 carrying a sealing ring 39 adapted to seat on a seat 40 formed on the end of a generally cylindrical member 41 within the intermediate portion of the drogue. The cylindrical member 41 is threadedly engaged at 42 with the right-hand end of the spherical portion 14. The member 41 has a cylindrical face at its left end as shown at 43 and which engages an internal cylindrical face of the spherical portion 14. A seal 45 is provided between the member 13 and the member 41 and a seal 46 is provided between the right-hand end of the spherical portion 14 and the member 13.

In the end of the member 41, formed in part by grooves in the surface 43, three circumferentially spaced ports 47, opening into the face 40 and connecting the interior of the drogue with three circumferentially spaced hydraulic actuators 48, respectively. Extending outwardly of each actuator is a toggle link 49 which is moved reciprocally by the operation of the actuator. The toggle link is connected on a pivot 50, supported by a link 51 which in turn is supported on a pivot 52, secured in a bracket 53 radially outwardly of the cone 12. A roller 54 is supported on a pin 55 in the link 51. The links 49 and 51 form a knee which is adapted to be flexed into a circumferential groove or channel 56 in the probe, generally designated as 57.

Figure 2:
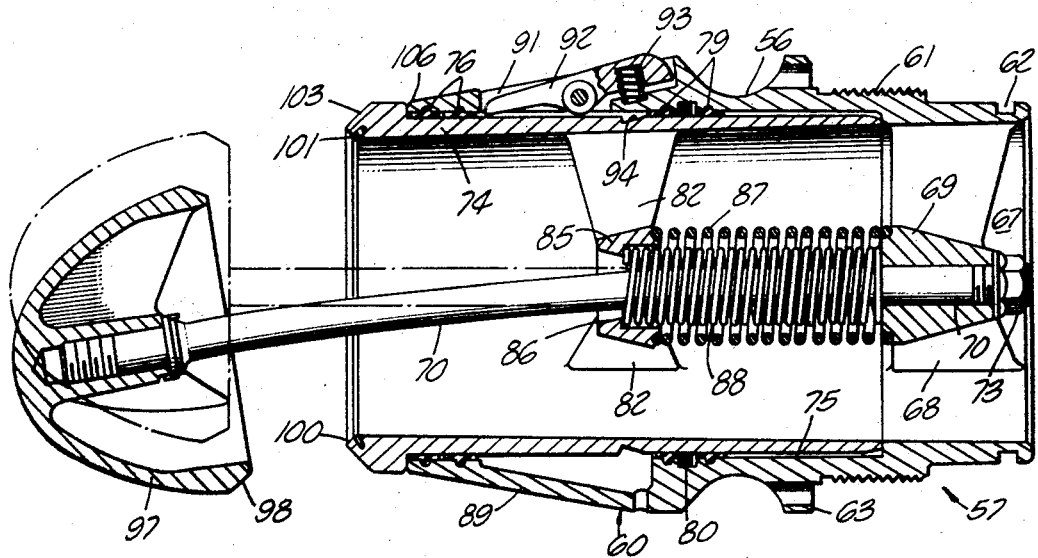
FIG. 2 is a side elevational view of the probe as shown in FIG. 1 with its poppet valve open and in a laterally deflected position.
Figure 3:
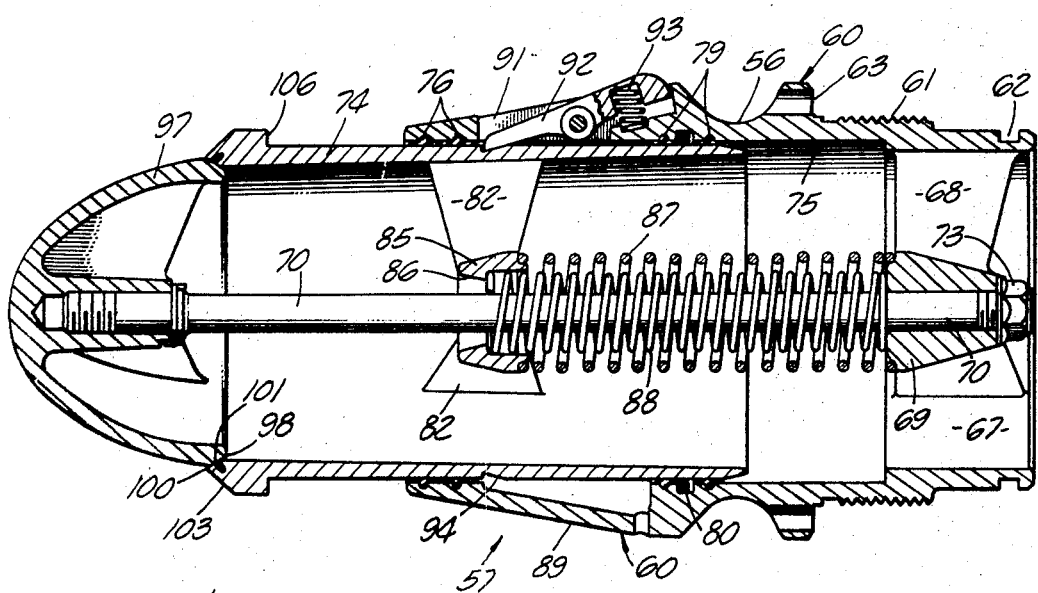
FIG. 3 is a cross-sectional side elevational view of the probe valve in its normally closed position.

Referring to FIGS. 1–3, the probe 57 is shown to comprise a generally cylindrical housing member 60 having a threaded portion 61, an annular groove 62 and a shoulder 63, adapting it for connection to a tubular member extending from the airplane to be refueled. The housing 60 has a generally cylindrical opening therethrough and at the outlet 67 there are a plurality of radially directed webs 68, supporting a centrally positioned frusto-conical member 69, having a bore through which extends a valve stem 70. The stem 70 is secured and adjusted in place by means of a nut 73 on the outer end thereof. Surrounding the stem and slidably and telescopically fitted into the housing is a sleeve 74. The sleeve is mounted to slide within an inner cylindrical surface 75 of the housing, and is spaced radially therefrom by Teflon bearings 76 and 79, and a seal 80. The bearings and seal are fitted in annular grooves in the inner housing surface.

Extending radially inwardly from the internal surface of the sleeve, positioned longitudinally centrally, are a plurality of radially directed webs 82 terminating inwardly to support a generally frusto-conical stem guide and spring support 85 which has a centrally positioned, with respect to the housing and sleeve, longitudinally directed circular opening through which the stem 70 extends. At the left end of the opening there is a tapered surface 86 increasing in diameter toward the left. The right end of the guide supports coiled springs 87 and 88, having their other ends supported on the member 69. The coil springs surround the stem and two are provided for reliability. The springs 87 and 88 hold the sleeve in the position it is shown in FIG. 3 and the sleeve operates against them when it moves inwardly into the housing as shown in FIG. 2.

The housing 60 is flared outwardly at 89 and has a plurality of sloted portions, as shown at 91, and in each is a pivoted latch member 92, biased by a spring 93. The forward end of each latch engages a shoulder in an annular groove 94 in sleeve 74 and prevents the retraction of the sleeve until the latches are released by the coupling of the drogue and probe.

Thestem 70 carries at its forward, outer end a combined valve and valve operator 97, it being a valve with regard to the sleeve 74 and a valve operator in regard to the drogue. The valve operator 97 has the shape of a convex dome so as to fit into the concave face of the valve 35, as shown in FIG. 1. The poppet valve 97 has a conical face 98 which seats on a mating conical face 100 on the outer end of the sleeve. A sealing ring 101 normally provides a seal between the valve and the end of the sleeve, the sleeve being biased into sealing contact with the valve by means of the springs 87 and 88 so as to form a normally closed valve at the end of the probe. The valve 97 is adjusted to be in a normally sealed position on the sleeve by means of the adjusting nut 73 on the valve stem 70, the rotation of a nut being adapted to change the compression on the springs 87 and 88.

The outer end of the sleeve has a second conical face 103 which is adapted to contact a complementary surface 104 of the probe member 41, as shown in FIG. 1. A sealing ring 105 is provided in a groove in the surface 104 to seal the probe in the drogue. Adjacent the end of the probe is an annular shoulder 106 which limits the movement of the probe into the housing by making contact with a forward end of the flared portion 89, as shown in FIGS. 1-3.

When by the forward motion of the plane to be refueled, the probe 57 is moved into the drogue 10 trailing rearwardly of the fueling plane, the three latches 92 make contact with the interior surface of the drogue member 41 to be moved inwardly against the spring 93, and their forward ends move outwardly of the groove 94. The sleeve 74 is then able to be retracted or forced into the housing 60. The retraction occurs when the face 103 on the probe makes contact with the face 104 on the drogue member 41, as shown in FIG. 1, and at which time a seal is formed between the probe and the drogue by means of the ring 105.

As the retraction of the sleeve occurs, the housing and the valve actuator 97 continue to move inwardly and the latter moves into the concave portion of the poppet valve 35 to move its sealing surface 38 off its seat 40. At this time, the poppet 97 and the poppet 35 are then in their open positions. When the sealing ring 39 moves off of the seat 40, fuel pressure within the drogue is admitted to the three hydraulic actuators 48 through the respective ports 47 to assist springs, not shown, in the actuators in urging the toggle links 49 outwardly of the actuators so as to flex the toggle joint and urge the rollers 54 into the channel 56. A latching force is thus applied to latch the probe and drogue together with a desired breaking resistance, dependant upon the fuel pressure and conveniently variable by adjustment of the springs in the hydraulic actuators 48. The drogue and probe are thus assembled and coupled for the flow of fuel through the drogue, into the probe and into the plane being refueled.

When the fueling operation has been completed, the fuel pressure within the drogue is reduced or depleted. The probe is then free to come out of the drogue by overcoming the toggle spring action, allowing withdrawal of the probe by action in the plane having been fueled, or by withdrawal of the drogue by action in the fueling plane.

In the prior art, it has been found that during the withdrawal of the valve 97, due to misalignment of the probe and drogue, the valve actuator 97 at times tends to be caught within the drogue. As the withdrawal continues before the valve actuator 97 slips loose, there has been a tendency to permanently deform the prior art valves stems as the result of a lateral force differential between the valve 97 and the housing to which it is secured by the stem.

It has been found that the valve stem 70, as made according to the invention, has the desired amount of flexibility and strength so that it can move laterally off center, without permanent deformation, and that the valves 97 move freely out of the drogue, even if temporarily stuck within the drgue. This action of the valve 97 and its stem 70 is indicated in the full lines in FIG. 2, the broken lines showing the normal position of the valve and stem. It may be seen in FIG. 2 that the conical stop surface 86 of the guide 85 provides a lateral movement stop for the off center movement of the stem.

The design of the shaft 70 is critical because in order to provide the required flexibility, a slender, highly heat treated spring rod is required. It has been found that the proper strength and flexibility is achieved for the stem 70 with the use of PH 15-7 MO CRES (precipatate hardening, 15% chromium, 7% nickel molybdenum corrosion resistant steel) when it is highly heat treated. For a stem having a diameter about $5/16$ of an inch and having an exposed length of about $6\frac{1}{2}$ inches between its connection to the valve and to the member 69, made in accordance with the foregoing, there is a permissible lateral deflection of $3/4$ of an inch at the valve connection without any permanent deformation.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example.

I claim:
1. In a probe adapted to cooperate with a drogue in an in-flight aircraft refueling system,
   (a) a probe housing;
   (b) a cylindrical retractable sleeve slidably engaged in a cylindrical opening in said housing and having a valve seat at an outer end of said sleeve;
   (c) a valve secured to an outer end of a stem and adapted to cooperate with said sleeve,
   (d) said stem having an inner end secured centrally within said housing on a stem supporting member,
   (e) said stem normally extending through the center of said sleeve,
   (f) means normally urging the sleeve in a direction to cause it to seat with the valve, the valve normally being centrally positioned with respect to the seat and sleeve, (g) the sleeve being adapted to be retracted in the probe housing upon engagement with a drogue so as to open the valve; the improvement comprising:

(h) means to permit the valve to move off the center with respect to the sleeve and seat when it is open, said means to permit comprising a stem in the form of a spring rod movable off center at its outer end by a lateral force differential between said valve and said housing; and (i) means to return said valve to center from an off center position.

2. The invention according to claim 1 including:

(a) a lateral movement stop surrounding a portion of said stem within said sleeve, (b) said stop supported on said sleeve and adapted to move longitudinally with respect to said stem when said sleeve moves in said housing, (c) said stop having its center on the center of said sleeve, (d) said stop having an inner surface spaced from said stem a predetermined amount to limit the lateral movement of said valve and the outer end of the stem when said valve is open.

3. The invention according to claim 2 in which: said means urging said sleeve is comprised of spring means surrounding said stem and being biased between and against said stop and said stem supporting member.

4. The invention according to claim 1 in which: said stem is biased to return its outer end to center when off center so as to return to center when said lateral force differential is removed.

5. In a probe adapted to cooperate with a drogue in an in-flight aircraft refueling system, (a) a probe housing;

(b) a cylindrical retractable sleeve slidably engaged in a cylindrical opening in said housing and having a valve seat at an outer end of said sleeve;

(c) a valve outwardly of said sleeve and secured to an outer end of a stem and adapted to cooperate with said sleeve, (d) said stem having an inner end secured centrally within said housing on a stem supporting member, (e) said stem normally extending through the center of said sleeve, (f) means normally urging the sleeve in a direction to cause it to seat with the valve, the valve normally being centrally positioned with respect to the seat and sleeve, (g) the sleeve being adapted to be retracted in the probe housing upon engagement with a drogue so as to open the valve; the improvement comprising:

(h) means to permit the valve to move off the center with respect to the sleeve and seat when it is open.

References Cited

UNITED STATES PATENTS 3,273,757   9/1966   Moen _____ 251—342

WILLIAM F. O'DEA, Primary Examiner

H. M. COHN, Assistant Examiner

U.S. Cl. X.R.

137—614.03, 614.06; 244—135; 251—344